Patented Nov. 18, 1952

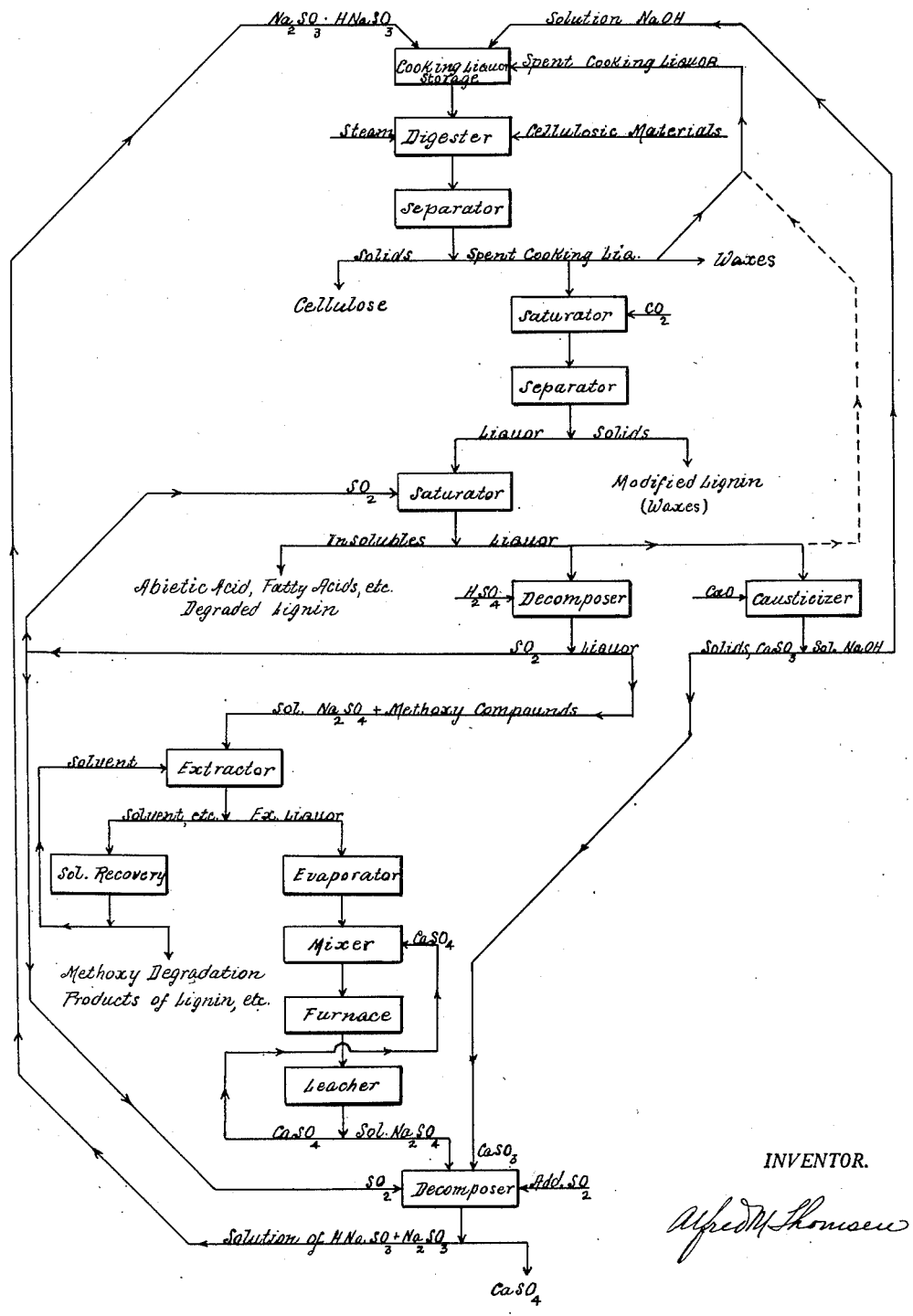

2,618,610

UNITED STATES PATENT OFFICE 2,618,610

METHODS OF REGENERATING A SPENT COOKING LIQUOR RESULTING FROM THE DIGESTION OF A CELLULOSE-LIGNIN COMPLEX

Alfred M. Thomsen, San Francisco, Calif.

Application September 2, 1947, Serial No. 771,793

1 Claim. (Cl. 252—183)

The term "incrustant" as used herein comprises all those substances, naturally present in a cellulose complex, except the cellulose itself. In general such substances are lignin, gums, polysaccharides, resins, fats and fatty acids, waxes, and many minor components. It is the aim and object of my process not merely to separate the cellulose from these substances but to do so in such a manner that the strength of the cellulose, if present in fiber form, be substantially unimpaired. It is also the intent to facilitate the recovery of such of the incrustants as have a marketable importance, not merely as separate from the cellulose, but also separate and distinct from one another, or in distinct and individual groups.

To achieve this object I avail myself of the solvent power of an alkali metal hydroxide, modified in its effect by the presence of a large amount of the corresponding alkali metal sulphite. I use the term "alkali metal" to designate either sodium or potassium since both are interchangeable, potassium being somewhat the better but sodium the cheaper. However, most of these cellulose complexes are in themselves sources of potassium and/or sodium so that the cyclically functioning liquor for resolving becomes in time a mixture of both.

There is, of course, nothing particularly "new" in the use of a sulphite as a modifier in an alkaline cook, except perhaps in the amount of such modifier which my process permits me to use and still remain economically sound. Rather, my process resides in the steps whereby cyclic re-use of the cooking liquor is rendered possible and a large amount of the modifier is rendered possible.

While the process can best be followed in the full detail set forth on the flowsheet, I wish first of all to describe a few of the general characteristics. For simplicity, on the flow sheet, I have used the designation "sodium" throughout, and I have incorporated all the various steps needed to resolve a complex but many of these steps will at times be eliminated as the particular complex under consideration will not require their employment.

The underlying requirement in all cases is, of course, to obtain from the spent cooking liquor both the caustic soda and the sodium sulphite with which the operation was inaugurated. I attain this object by converting the organic soda salts produced in cooking into sulphites and bisulphites by interaction with $SO_2$ and separating the organics thus rendered insoluble. The sulphites are then converted to caustic soda by causticizing with lime as if they had been carbonates, the insoluble sulphite being separated, thus reforming a part of the cooking liquor. The sulphite component is made up by recycling a portion of the sulphites prior to such causticization, or by recycling a portion of the spent cooking liquor, or both. However, such treatment will in time produce an accumulation of degraded organic compounds that are not rendered insoluble by the $SO_2$ treatment, and to prevent this accumulation I by-pass a sufficient amount through a furnace step where all such organics are destroyed and the resident soda salts are simultaneously converted to sulphates.

The sodium sulphate obtained in said furnace step is then converted into a sulphite-bisulphite combination by commingling it in water solution with the calcium sulphite obtained in causticizing, as previously described, and passing $SO_2$ into same. The calcium sulphate produced is separated and the sulphite liquor re-cycled. In the furnace step it is an advantage if sufficient calcium sulphate be added so that a relatively dry powder is produced instead of a semi-liquid mass of fused soda salts. Such a powdery furnace charge is easily handled and oxidation of the resident sulphur compounds to the sulphate is rendered almost complete. As the process yields calcium sulphate, and as it can be recycled almost as often as desired without change, such use of calcium sulphate is of no economic disadvantage.

As indicated on the flow sheet, this "skeleton process" can now be opened up at various points by supplementary steps. If the raw material contain a wax said wax will be emulsified in cooking and will separate from the cooking liquor on cooling and standing, or it may be recovered by a centrifuge.

Instead of passing $SO_2$ into the cooking liquor and thus obtaining a mixture of all substances rendered insoluble by acidification, a preliminary saturation with $CO_2$ may be employed. Such practice will lead to the removal in solid form of most of the lignin. A second saturation with $SO_2$ will thus yield its precipitation without having same contaminated with much lignin that has been previously removed. The second saturation will produce little except the abietic and fatty acid components in a much purer form than would be the case if a single saturation with $SO_2$ were employed. Some degraded lignin will generally be obtained likewise, but only orthodox methods, i. e., suitable solvents such as are used in the recovery and purification of oils and fats are needed to effect any desirable amount of separation and/or purification deemed desirable by the operator.

Similarly, instead of sending a portion of the spent cooking liquor directly to the furnace step, it will at times be far better to give it the treatment indicated on the drawing. If a large portion of the incrusting material be lignin then the degradation of same may have produced sundry valuable products depending upon the nature of the raw cellulosic material. These may vary from such simple organic acids as acetic and formic to complex aggregates of the methoxyl component of the degraded lignin as vanillin, aceto-vanillone, and syringaldehyde.

In order that such substances may be recovered I have outlined the plan indicated in the drawing. By the use of a strong mineral acid, in this case sulphuric, such bodies are set free from their respective combinations and rendered susceptible to extraction by means of suitable solvents of which there is a wide choice including ether, benzine, trichlorethylene, and others too numerous to mention. Depending upon the type of material which is to be extracted the operator will easily pick a suitable one by consulting the rather voluminous literature on such subjects. The addition of sulphuric acid will, of course be attended by an evolution of $SO_2$ which can be used elsewhere in the process, while additional $SO_2$ may be added at will.

Having extracted such resident methoxyl derivatives the residual liquor is next evaporated to as high as density as compatible with crystallization dangers, mixed with $CaSO_4$ and passed through a furnace with a highly oxidizing atmosphere so as to burn out all carbon and oxidize to sulphates all accidentally reduced sulphur compounds. It is most essential that this be done as otherwise malodorous gases will be produced in the next digestion and general contamination will ensue. By a leaching step separation is then made between the sodium sulphate and the calcium sulphate, the latter being recycled. Conversion of sodium sulphate to sulphite by the use of $CaSO_3$ and $SO_2$ is then indicated.

The drawing will now be fully described and at the same time a preferred version with a definite raw material will be given. In this case the raw material will be the highly resinous product of the stumps of the sugar pine. Such material will contain on a dry weight basis as much as 40% of resinous matters. After comminution it is digested at a gage pressure of about 85 lbs. with a cooking liquor containing about 40% of the weight of the wood as caustic soda and about one half as much of sodium sulphite. The fluid will consist of about one half water, the other half being spent cooking liquor from a previous cook. Cooking time will be about three hours. Manifestly, if the pressure be raised the time can be correspondingly shortened.

After complete digestion separation is made between the cellulose, in this case paper pulp, and the cooking liquor of which one half will be reserved for a subsequent cook. The balance is first treated with carbon dioxide, or with a gas containing same such as stack gases or lime kiln gas, until there is no further precipitation of organic material, in the main a somewhat modified form of lignin.

The precipitate is removed by filter or centrifuge, and the residual liquor is then acidified by passing $SO_2$ or a gas containing same such as roaster gas, or in part the $SO_2$ evolved at a later step in the process as indicated. Manifestly, a shortage can be made up by merely burning sulphur.

By such saturation the resin acids of the wood, as well as any fatty acid, chiefly oleic, which accompanies it, is set free from its combination with sodium and separates out. Additional organics are also precipitated but are considered here simply as impurities. A suitable solvent, such as alcohol will effect good purification from such contamination, after which it may be subjected to any type of refining selected. Conventional soap removal may precede either saturation.

However, as such steps fall rather in the category of refining, than in separating, the constituents rendered insoluble by such $SO_2$ treatment it is considered as beyond the scope of this disclosure.

The liquor separated from these insolubles is now divided into two portions and each portion is given a different treatment. The relative amounts depend upon the proportion of caustic to sulphite which has been selected as desirable in the cooking liquor, in this case approximately 2 parts of caustic to one of sulphite. Approximately two thirds of the liquor is, therefore, causticized directly with lime, the $CaSO_3$ produced removed and reserved for future treatment, and the resulting caustic liquor re-cycled to the cooking liquor storage tanks. The dotted line above the causticizer indicates that any desired fraction of the $SO_2$ treated liquor, after separation of the insolubles, may also be re-cycled to the cooking liquor storage tanks, thus supplying the sulphite requirement directly.

If this practice be not followed, or followed only in part, then the sulphite requirement is met by the following treatment of the one-third of the $SO_2$ treated liquor which was not causticized. In the drawing this is treated with sulphuric acid to set free its contained $SO_2$ and to convert the resident soda salts to sulphate. The $SO_2$ is recycled where required and the residual solution extracted with a suitable solvent for the two principal degradation products of the methoxyl content of lignin, in this case vanillin and acetic acid. Both of these may be removed to any extent desired by the use of ether or similar solvent. The residual liquor is then evaporated, commingled with $CaSO_4$ if desired, and calcined in an oxidizing operation so as to remove all organic impurities and convert any reduced soda salts back to sulphate.

The sodium sulphate thus obtained is then converted to sulphite and/or bisulphite by commingling a solution of same with the calcium sulphite produced in causticizing and with additional $SO_2$ until the resident calcium shall be present principally as calcium sulphate. The latter is separated, being but sparingly soluble, from the sulphite solution which is recycled to the storage tanks for cooking liquor. Manifestly, if this procedure gives rise to an undue increase in the proportion of caustic to sulphite, or the reverse, then the proportion of the total $SO_2$ treated liquor that is causticized is altered in conformity with such results.

It is evident that if the methoxyl degradation products are not present in sufficient amount to warrant their separation, or if it be preferred to let them be destroyed by fire, then the sulphuric acid step could be omitted entirely and the fraction of liquor represented could be passed directly to the furnace. The soda salts would issue substantially as sulphate and this could then be converted to sulphite as previously described. It should also be noted that if acetic acid be the principal product, then it can be extracted by crystallization, between the "evaporator" and the "furnace," or rather as sodium acetate is the more soluble it would remain in the mother liquor while sulphate of sodium would crystallize out and be treated as previously described. All such minor modifications fall clearly within the bounds of this disclosure.

Finally, as an extreme version of such simplification, if cellulose be the one object sought, the un-recycled portion of the spent cooking liquor could be evaporated and furnaced directly yielding as ash a mixture of carbonate and sulphate. $CaSO_4$ would not be a desirable diluent to the charge in this case but ferric oxide would serve admirably. The calcines would then be causticized and excess $Na_2SO_4$ crystallized out, the latter being subsequently converted to sulphite by interaction with lime and $SO_2$.

It should be noted the recycling of a large part of the spent cooking liquor direct, followed by another return as causticized liquor of more of this same spent liquor, which necessarily also contains its quota of soda salts and of the methoxy degradation compounds, will result in a high degree of concentration of all such compounds in the fraction that is finally furnaced so as to keep such organic compounds within definite limits. Such concentration makes the recovery of these compounds far easier than would be the case if the spent liquor were not reused and it were attempted to work it at once for such substances.

But it is the effect of such a large amount of relatively inert chemicals upon the cellulose which is particularly important. Most important types of cellulose are in some type of fiber form and the strength of the resultant fibers are of the utmost importance. The presence of such a large amount of relatively inert salts, organic degradation products, etc., have a profound influence on the way in which the caustic and sulphite attack the incrustants, leaving the cellulose but little altered.

No direct instruction can be given, except in the special case of a definite type, such as the pine stump wood of the preferred illustration, for how much should be re-cycled and what should be the relative amounts of sulphite and hydroxide. In each and every case, small scale tests must be made and varied until that combination is formed which gives the best results. Thus the sulphite may be as little as 10% on the caustic and as much as 150%. Likewise, re-cycling crude spent liquor, without previous treatment as a cooking liquor component, may vary from 10% to as much as 80% of total amount produced. Intermediate re-cycling of the spent liquor after the $SO_2$ treatment may replace a part of this crude spent liquor, or all of it in special cases. All such modifications are clearly within the scope of my process, and only individual tests can give the most satisfactory combinations.

Neither can any hard and fast rules be laid down for the time and/or temperature cycle. Citronella grass can be resolved in an hour at 30 lbs. gage pressure, while the preferred version on stumpwood required 3 hours at 85 lbs. pressure. Manifestly, if the temperature be raised the time can be shortened, but the effect on the cellulose cannot be predicted and must be obtained in each and every case by actual test. Similarly, liquor concentration is governed by the need to keep the cellulosic material covered with cooking liquor so that an open structure with much void will mean the use of a relatively weaker liquor in larger amount than would be needed on a denser charge.

Having thus fully described my process, I claim:

The method of regenerating a spent cooking liquor resulting from the digestion of a cellulose-lignin complex with a solution of caustic soda and sodium sulphite containing residual organic materials derived from said complex, which comprises; re-cycling a portion of said spend liquor as an ingredient of the new cooking liquor; saturating the remainder with $CO_2$ and separating the organics thus rendered insoluble; acidifying the residual liquor with $SO_2$; separating the organics thus rendered insoluble and re-cycling a portion of the acid liquor produced as an ingredient of new cooking liquor; causticizing a portion of said liquor, remaining after the aforesaid re-cycling, with lime, separating and reserving for future use the $CaSO_3$ thus produced, and re-cycling the caustic liquor as an ingredient of new cooking liquor; decomposing the remainder of the sulphur dioxide treated liquor, not thus causticized, with sulphuric acid; separating the $SO_2$ and the organics liberated by such treatment; commingling the remaining solution with re-cycled calcium sulphate and heating in an oxidizing atmosphere until all organic material has been destroyed; leaching with water the resultant calcines thus separating calcium sulphate from a solution consisting essentially of sodium sulphate; commingling said solution with the $CaSO_3$, previously obtained and reserved, and acidifying with $SO_2$; separating the calcium sulphate produced thereby and re-cycling the resultant solution of sodium sulphite as an ingredient of the new cooking liquor; finally, so adjusting the size of the various re-cycled fractions so as to obtain a new cooking liquor substantially identical in component parts to the cooking liquor from which said spend liquor was derived.

ALFRED M. THOMSEN.

REFERENCES CITED

The following references are of record in the file of this patent:

UNITED STATES PATENTS

| Number | Name | Date |
|--------|------|------|
| 1,606,501 | Bradley et al. | Nov. 9, 1926 |
| 1,637,515 | Bradley et al. | Aug. 2, 1927 |
| 1,651,665 | Bradley et al. | Dec. 6, 1927 |
| 1,689,534 | Richter | Oct. 30, 1928 |
| 1,743,080 | Bradley et al. | Jan. 7, 1930 |
| 1,765,560 | Barbou | June 24, 1930 |
| 1,797,678 | Bradley et al. | Mar. 24, 1931 |
| 1,819,152 | Dorner | Aug. 18, 1931 |
| 1,860,803 | Bradley et al. | May 31, 1932 |
| 1,860,848 | Bradley et al. | May 31, 1932 |
| 1,864,619 | Richter | June 28, 1932 |
| 1,934,957 | Wells | Nov. 14, 1933 |
| 2,029,616 | Haglund | Feb. 4, 1936 |

FOREIGN PATENTS

| Number | Country | Date |
|--------|---------|------|
| 43,863 | Norway | Mar. 21, 1927 |

OTHER REFERENCES

Manufacture of Pulp and Paper, 3rd ed., vol. III, Sec. 5, pg. 5 (1937), published by McGraw-Hill Book Co., Inc., New York.